United States Patent
Kitamori

(10) Patent No.: US 11,782,265 B2
(45) Date of Patent: Oct. 10, 2023

(54) VIBRATION DEVICE

(71) Applicant: Murata Manufacturing Co., Ltd., Nagaokakyo (JP)

(72) Inventor: Nobumasa Kitamori, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 347 days.

(21) Appl. No.: 17/376,203

(22) Filed: Jul. 15, 2021

(65) Prior Publication Data

US 2021/0341732 A1    Nov. 4, 2021

Related U.S. Application Data

(63) Continuation of application No. PCT/JP2020/048771, filed on Dec. 25, 2020.

(30) Foreign Application Priority Data

Apr. 27, 2020  (JP) .................. 2020-078190

(51) Int. Cl.
    *G02B 27/00*    (2006.01)
    *B06B 1/06*     (2006.01)
    (Continued)

(52) U.S. Cl.
    CPC ........ *G02B 27/0006* (2013.01); *B06B 1/0655* (2013.01); *H04N 23/52* (2023.01); *B06B 2201/77* (2013.01)

(58) Field of Classification Search
    CPC ...... H04N 23/52; H04N 23/68; H04N 26/682; H04N 2201/02491; G02B 27/0006;
    (Continued)

(56) References Cited

U.S. PATENT DOCUMENTS 10,268,039 B2 * 4/2019 Nishiyama ............... B06B 1/06
10,444,495 B2 * 10/2019 Fujimoto ............... G02B 27/00
(Continued)

FOREIGN PATENT DOCUMENTS

CN    110621418 A    12/2019
JP    2535727 Y2    5/1997
(Continued)

OTHER PUBLICATIONS

Official Communication issued in corresponding Chinese Patent Application No. 202080034297.7, dated Apr. 18, 2022.
(Continued)

*Primary Examiner* — Marly S Camargo
(74) *Attorney, Agent, or Firm* — KEATING & BENNETT, LLP

(57) ABSTRACT

A vibration device includes a cylindrical body including a cavity, a first opening end surface, and a second opening end surface, a light-transmissive cover directly or indirectly bonded to the first opening end surface of the cylindrical body so as to cover the cavity of the cylindrical body, a piezoelectric body directly or indirectly bonded to the cylindrical body, and a buffer layer provided between at least one of the cylindrical body and the piezoelectric body, and the cylindrical body and the light-transmissive cover. The buffer layer includes an inner end portion on an inner side portion in a direction orthogonal or substantially orthogonal to the axial direction and an outer end portion on an outer side portion in a direction orthogonal or substantially orthogonal to the axial direction. A thickness of the inner end portion is larger than a thickness of the outer end portion.

20 Claims, 10 Drawing Sheets

(51) Int. Cl.
*H04N 23/52* (2023.01)
*H04N 23/68* (2023.01)

(58) Field of Classification Search
CPC ... B06B 1/0065; B06B 2201/77; B06B 1/161; B06B 1/166; B06B 3/00; B06B 1/06; H02K 5/24
See application file for complete search history.

(56) References Cited

U.S. PATENT DOCUMENTS

| | | | | |
|---|---|---|---|---|
| 10,768,507 | B2* | 9/2020 | Fujimoto | ............... G02B 27/00 |
| 11,002,954 | B2* | 5/2021 | Kuratani | ............ G02B 27/0006 |
| 11,161,448 | B2* | 11/2021 | Fujimoto | ............... H04N 23/00 |
| 11,434,891 | B2* | 9/2022 | Fujimoto | .................. B06B 1/06 |
| 2018/0210194 | A1 | 7/2018 | Nishiyama et al. | |
| 2019/0176195 | A1 | 6/2019 | Fujimoto et al. | |
| 2020/0055087 | A1 | 2/2020 | Fujimoto et al. | |
| 2020/0057301 | A1 | 2/2020 | Kuratani et al. | |
| 2020/0094570 | A1 | 3/2020 | Kudo et al. | |

FOREIGN PATENT DOCUMENTS

| | | |
|---|---|---|
| JP | 2006-279701 A | 10/2006 |
| JP | 2013-080177 A | 5/2013 |
| JP | 2020-049727 A | 4/2020 |
| WO | 2017/110564 A1 | 6/2017 |
| WO | 2018/100795 A1 | 6/2018 |
| WO | 2018/198465 A1 | 11/2018 |

OTHER PUBLICATIONS

Official Communication issued in International Patent Application No. PCT/JP2020/048771, dated Mar. 16, 2021.

\* cited by examiner

VIBRATION DEVICE

CROSS REFERENCE TO RELATED APPLICATIONS

This application claims the benefit of priority to Japanese Patent Application No. 2020-078190 filed on Apr. 27, 2020 and is a Continuation Application of PCT Application No. PCT/JP2020/048771 filed on Dec. 25, 2020. The entire contents of each application are hereby incorporated herein by reference.

BACKGROUND OF THE INVENTION

1. Field of the Invention

The present invention relates to a vibration device capable of removing water droplets and the like by mechanical vibration.

2. Description of the Related Art

In an imaging device, such as a camera used as a monitoring device, it has been required to always make a field of view clear. In particular, various mechanisms for removing water droplets, such as raindrops, have been proposed for cameras used outdoors for in-vehicle applications or the like. Japanese Unexamined Patent Application Publication No. 2013-080177 discloses a camera with a water droplet removing function including an imaging unit and a piezoelectric element that vibrates the imaging unit. The imaging unit includes a lens and an imaging element that photoelectrically converts light transmitted through the lens. The lens is supported by a lens holder. In order to remove water droplets adhering to the lens, the piezoelectric element vibrates the lens holder.

In the camera with a water droplet removing function described in Japanese Unexamined Patent Application Publication No. 2013-080177, stress is applied to the lens holder during vibration. Therefore, when used for a long period of time, the lens holder may be damaged by the stress continuously applied during vibration.

SUMMARY OF THE INVENTION

Preferred embodiments of the present invention provide vibration devices that are each able to reduce or prevent damage due to stress during vibration.

A vibration device according to a preferred embodiment of the present invention includes a cylindrical body including a cavity, a first opening end surface, and a second opening end surface, a light-transmissive cover directly or indirectly bonded to the first opening end surface of the cylindrical body so as to cover the cavity of the cylindrical body, a piezoelectric body directly or indirectly bonded to the cylindrical body, and a buffer layer between at least one of the cylindrical body and the piezoelectric body and the cylindrical body and the light-transmissive cover, in which when a direction connecting the first opening end surface and the second opening end surface of the cylindrical body is defined as an axial direction, the buffer layer includes an inner end portion on an inner side portion in a direction orthogonal or substantially orthogonal to the axial direction and an outer end portion on an outer side portion in a direction orthogonal or substantially orthogonal to the axial direction, and a thickness of the inner end portion is larger than a thickness of the outer end portion.

With each of the vibration devices according to preferred embodiments of the present invention, damage due to stress during vibration is able to be reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, the present invention will be clarified by describing preferred embodiments of the present invention with reference to the drawings.

It should be noted that the preferred embodiments described in the present specification are exemplary, and partial replacement or combination of configurations between different preferred embodiments is possible.

Figure 1:
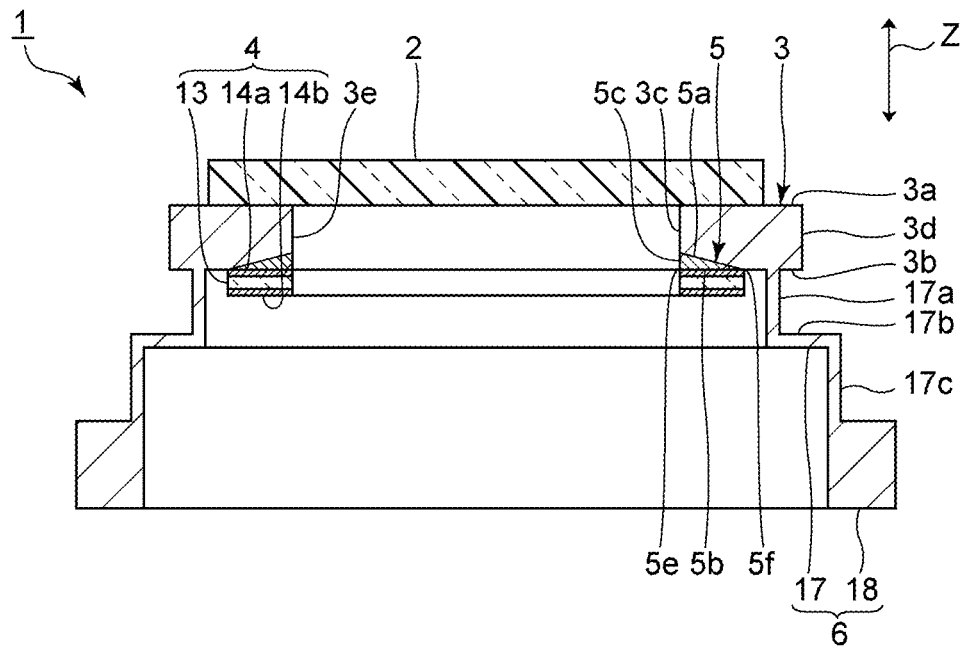
FIG. 1 is a front cross-sectional view of a vibration device according to a first preferred embodiment of the present invention.
Figure 2:
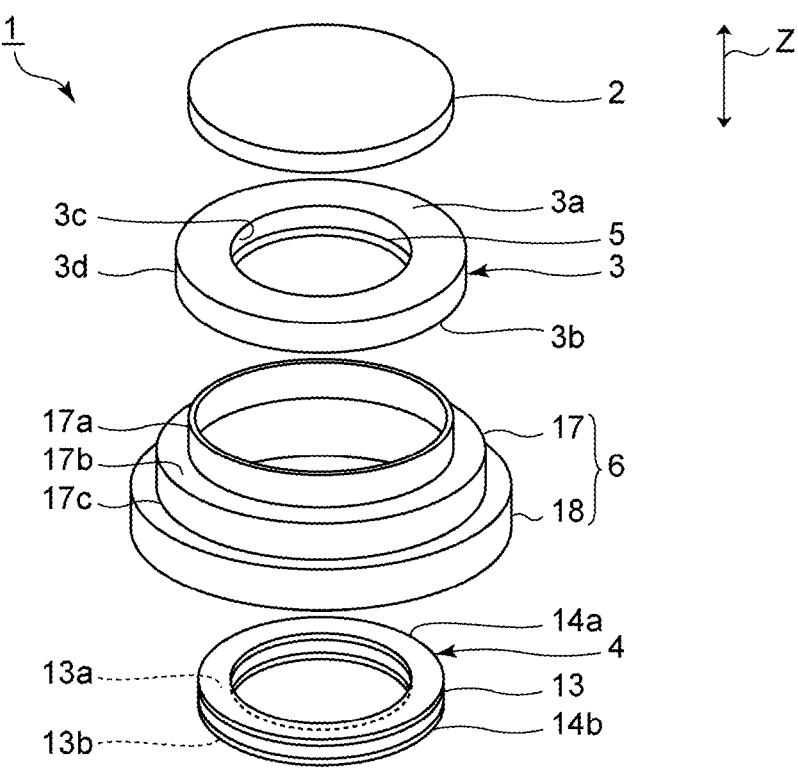
FIG. 2 is an exploded perspective view of the vibration device according to the first preferred embodiment of the present invention.

FIG. 1 is a front cross-sectional view of a vibration device according to a first preferred embodiment of the present invention. FIG. 2 is an exploded perspective view of the vibration device according to the first preferred embodiment.

The vibration device 1 illustrated in FIG. 1 and FIG. 2 is a vibration device that removes water droplets and foreign matter from the field of view of an imaging element or the like by moving water droplets and foreign matter by vibration or atomizing water droplets or the like. The vibration device 1 includes a light-transmissive cover 2, a cylindrical body 3, a piezoelectric element 4, a buffer layer 5, and a holding member 6.

An internal space is defined by the light-transmissive cover 2, the cylindrical body 3, and the holding member 6. An optical detection element, such as an imaging element, for example, is disposed in the internal space. Note that in this specification, the internal space is not limited to a sealed space, and a space partially open to the outside is also referred to as an internal space. The cylindrical body 3 and the holding member 6 may be integrally formed by a unitary structure or may be bonded to each other by welding or the like, for example.

The cylindrical body 3 includes a cavity 3e, a first opening end surface 3a, and a second opening end surface 3b. Here, a direction connecting the first opening end surface 3a and the second opening end surface 3b of the cylindrical body 3 is defined as an axial direction Z, and a direction orthogonal or substantially orthogonal to the axial direction Z is defined as a radial direction. The cylindrical body 3 extends in the axial direction Z. The cylindrical body 3 includes an inner surface 3c and an outer surface 3d. The inner surface 3c and the outer surface 3d are connected to the first opening end surface 3a and the second opening end surface 3b. In the present preferred embodiment, the cylindrical body 3 has a cylindrical or substantially cylindrical shape.

Figure 3:
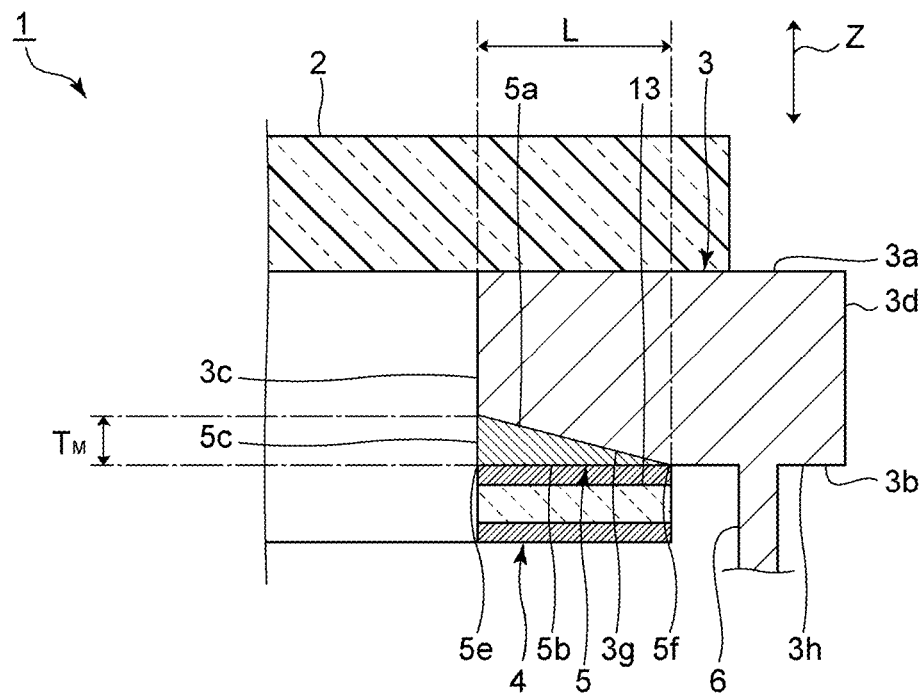
FIG. 3 is an enlarged view of FIG. 1.

FIG. 3 is an enlarged view of FIG. 1.

The second opening end surface 3b includes an inclined portion 3g and a non-inclined portion 3h. The inclined portion 3g is inclined with respect to the radial direction. Note that, in the present specification, being inclined with respect to the radial direction means being inclined in a cross-section along the axial direction Z. The second opening end surface 3b is inclined in the inclined portion 3g so as to approach the first opening end surface 3a as the second opening end surface 3b extends toward a radially inner side. The non-inclined portion 3h is a portion parallel or substantially parallel to the radial direction. An end portion on the radially inner side of the inclined portion 3g is connected to the inner surface 3c. An end portion on a radially outer side of the inclined portion 3g is connected to the non-inclined portion 3h. An end portion on the radially outer side of the non-inclined portion 3h is connected to the outer surface 3d. The shape of the cylindrical body 3 is not limited to a cylindrical or substantially cylindrical shape, and may be, for example, a rectangular or substantially rectangular cylindrical shape.

The cylindrical body 3 is made of an appropriate metal. However, a material of the cylindrical body 3 is not limited to metal, and an appropriate ceramic or the like may be used, for example.

Referring to FIG. 1, the light-transmissive cover 2 is bonded to the first opening end surface 3a of the cylindrical body 3. More specifically, the light-transmissive cover 2 is directly bonded to the cylindrical body 3 so as to cover the cavity 3e of the cylindrical body 3. The light-transmissive cover 2 has a disk shape. Note that the shape of the light-transmissive cover 2 is not limited to the above, and may be, for example, a dome shape. The shape of the light-transmissive cover 2 in a plan view may be, for example, a polygon. In the present specification, a plan view refers to a direction viewed from an upper side in the axial direction Z. The upper side in the axial direction Z corresponds to the upper side in FIG. 1.

As a material of the light-transmissive cover 2, for example, a light-transmitting plastic, quartz, glass such as borosilicate glass or soda-lime glass, or a light-transmitting ceramic or the like can be used. In this specification, the term light-transmitting property refers to a light-transmitting property through which at least an energy ray or light having a wavelength detected by an optical detection element, such as the above-described imaging element, for example, passes.

As illustrated in FIG. 3, the buffer layer 5 is bonded to the inclined portion 3g of the second opening end surface 3b of the cylindrical body 3. The buffer layer 5 has an annular shape. To be more specific, the buffer layer 5 includes a first surface 5a, a second surface 5b, and an inner surface 5c. The cross-sectional shape of the buffer layer 5 along the axial direction Z is a right triangle, for example. The first surface 5a and the second surface 5b are connected to the inner surface 5c. Further, the first surface 5a and the second surface 5b are connected to each other. The first surface 5a is inclined with respect to the radial direction. The second surface 5b includes a portion facing the first surface 5a and a portion connected to the first surface 5a.

Note that the buffer layer 5 includes an inner end portion 5e and an outer end portion 5f. The inner end portion 5e is an end portion positioned on the radially inner side. The inner end portion 5e includes the inner surface 5c. The outer end portion 5f is an end portion positioned on the radially outer side. The inner end portion 5e and the outer end portion 5f face each other in the radial direction. The outer end portion 5f is a portion in which the first surface 5a and the second surface 5b are connected to each other. A thickness of the inner end portion 5e is larger than that of the outer end portion 5f.

The first surface 5a of the buffer layer 5 is bonded to the inclined portion 3g of the cylindrical body 3. The second surface 5b of the buffer layer 5 and the non-inclined portion 3h of the second opening end surface 3b of the cylindrical body 3 are flush with each other. The inner surface 5c of the buffer layer 5 and the inner surface 3c of the cylindrical body 3 are flush with each other. As a material of the buffer layer 5, for example, metal, ceramic, glass, or the like can be used.

The piezoelectric element 4 is attached to the second surface 5b of the buffer layer 5. Note that the piezoelectric element 4 does not extend to the second opening end surface 3b of the cylindrical body 3. As illustrated in FIG. 2, the piezoelectric element 4 has an annular shape. The piezoelectric element 4 has an annular piezoelectric body 13. The piezoelectric body 13 includes a first main surface 13a and a second main surface 13b. More specifically, the first main surface 13a and the second main surface 13b face each other in the axial direction Z. The first main surface 13a is positioned on the cylindrical body 3 side.

The piezoelectric element 4 includes a first electrode 14a and a second electrode 14b. The first electrode 14a is provided on the first main surface 13a of the piezoelectric body 13. The second electrode 14b is provided on the second main surface 13b. The first electrode 14a and the second electrode 14b face each other. Each of the first electrode 14a and the second electrode 14b has an annular shape. The first electrode 14a is provided on the entire or substantially the entire first main surface 13a of the piezoelectric body 13. The second electrode 14b is provided on the entire or substantially the entire second main surface 13b. Note that the first electrode 14a may be provided on a portion of the first main surface 13a of the piezoelectric body 13. Similarly, the second electrode 14b may be provided on a portion of the second main surface 13b. For example, widths of the first electrode 14a and the second electrode 14b may be narrower than a width of the piezoelectric body 13. Alternatively, the shape of the first electrode 14a and the second electrode 14b may be an arc shape or the like.

As materials of the first electrode 14a and the second electrode 14b, appropriate metals can be used. The first electrode 14a and the second electrode 14b may be electrodes made of a metallic thin film such as Ag or Au, for example. In this case, the first electrode 14a and the second electrode 14b can be formed by a sputtering method or the like, for example.

As a material of the piezoelectric body 13, for example, an appropriate piezoelectric ceramics such as lead zirconate titanate (PZT), lead titanate (PT), or (K, Na) $NbO_3$, or an appropriate piezoelectric single crystal such as $LiTaO_3$ or $LiNbO_3$ may be used. Note that the shape of the piezoelectric body 13 is not limited to the above.

As illustrated in FIG. 3, the holding member 6 is connected to the non-inclined portion 3h of the second opening end surface 3b of the cylindrical body 3. As illustrated in FIG. 1, the holding member 6 includes a spring portion 17 and a bottom portion 18. One end portion of the spring portion 17 is connected to the second opening end surface 3b of the cylindrical body 3. The bottom portion 18 is connected to the other end portion of the spring portion 17. The cross-sectional shape of the spring portion 17 along the axial direction Z is a stepped shape. The bottom portion 18 has a cylindrical or substantially cylindrical shape. Note that the shapes of the spring portion 17 and the bottom portion 18 are not limited to those described above. The spring portion 17 may have, for example, a cylindrical or substantially cylindrical shape, a rectangular or substantially rectangular cylindrical shape, or the like. The bottom portion 18 may have, for example, a rectangular or substantially rectangular cylindrical shape, or the like.

The holding member 6 is made of an appropriate metal. Note that a material of the holding member 6 is not limited to metal, and for example, ceramic or the like can also be used, for example. The vibration device 1 is fixed to the outside, for example, at the bottom portion 18 of the holding member 6.

The present preferred embodiment is characterized in that the buffer layer 5 is provided between the cylindrical body 3 and the piezoelectric element 4, and a thickness of the inner end portion 5e is larger than that of the outer end portion 5f in the buffer layer 5. Thus, stress applied to a bonding interface between the cylindrical body 3 and the piezoelectric element 4 can be reduced. Therefore, damage to the vibration device 1 due to stress during vibration can be reduced or prevented. Therefore, reliability can be improved. The advantageous effects of reducing the stress will be described in detail below. Note that the bonding interface between the cylindrical body 3 and the piezoelectric element 4 in the present preferred embodiment is a bonding interface with the buffer layer 5 interposed therebetween.

Figure 4:
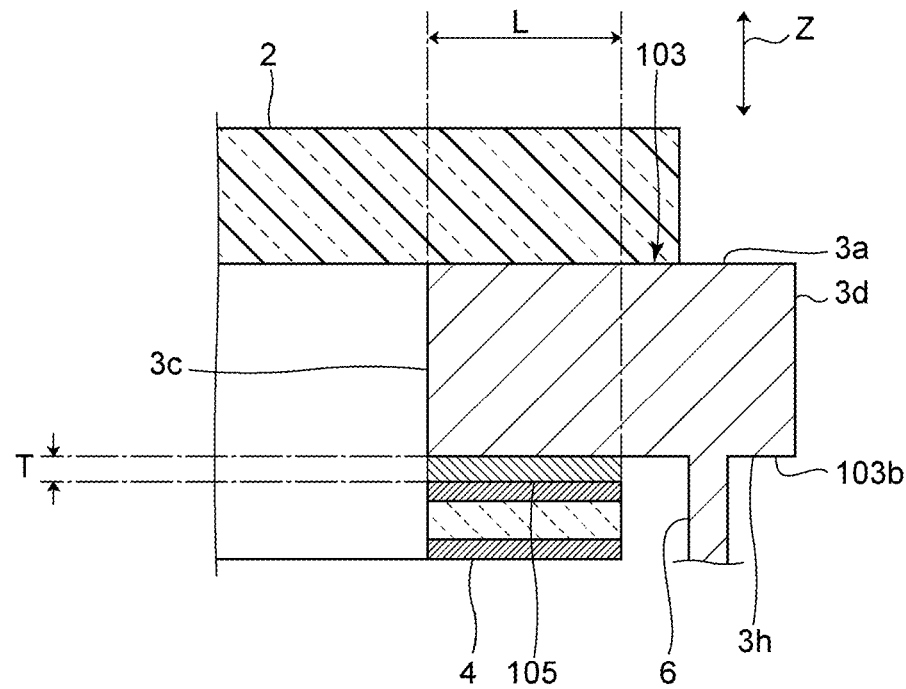
FIG. 4 is a front cross-sectional view of a vibration device according to a second comparative example.

Stress distribution in the vibration device of the first preferred embodiment and vibration devices in a first comparative example and a second comparative example was compared. Note that the first comparative example is different from the first preferred embodiment in that the buffer layer is not provided and the second opening end surface of the cylindrical body does not include an inclined portion. As illustrated in FIG. 4, the second comparative example is different from the first preferred embodiment in that a thickness of a buffer layer 105 is constant or substantially constant in the radial direction and a second opening end surface 103b of a cylindrical body 103 does not include an inclined portion.

Figure 5:
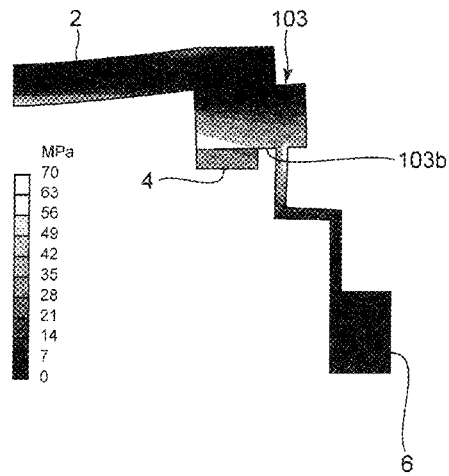
FIG. 5 is a diagram illustrating vibration displacement and stress distribution in a vibration device of a first comparative example.
Figure 6:
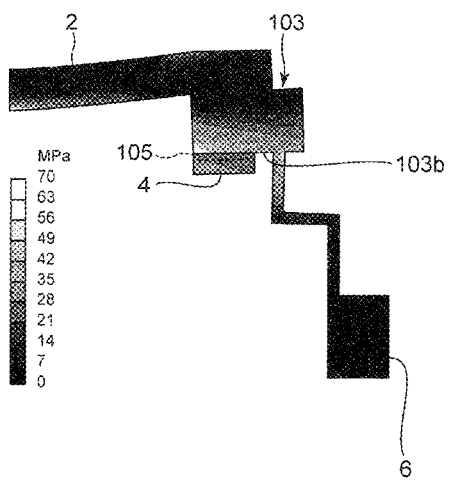
FIG. 6 is a diagram illustrating vibration displacement and stress distribution in the vibration device of the second comparative example.
Figure 7:
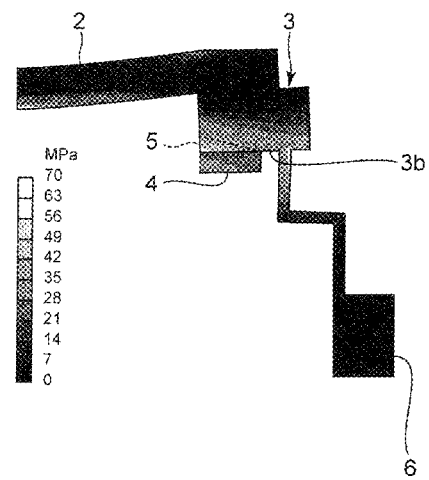
FIG. 7 is a diagram illustrating vibration displacement and stress distribution in the vibration device according to the first preferred embodiment of the present invention.
Figure 8:
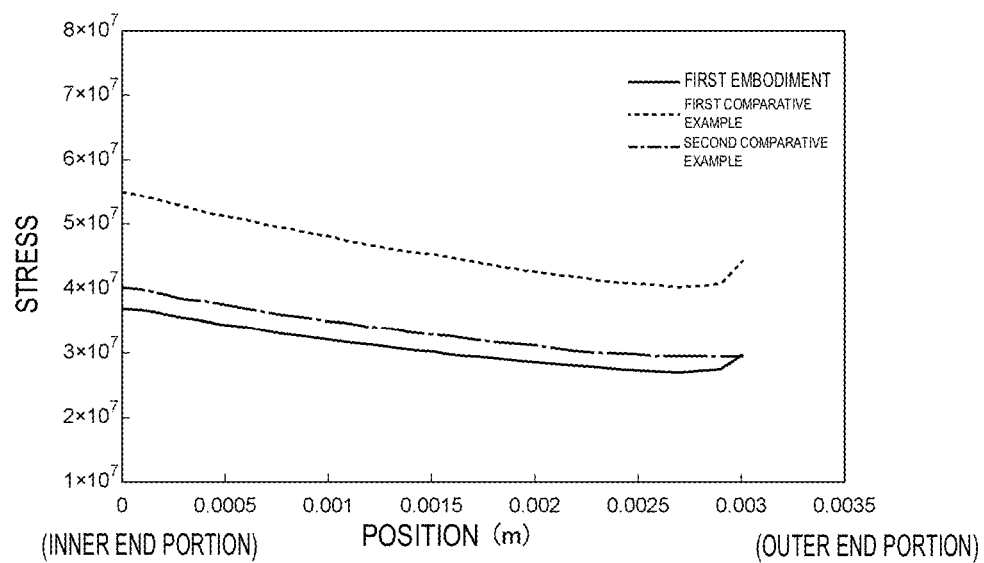
FIG. 8 is a graph illustrating a relationship between a position in a radial direction and stress applied to a bonding interface between a cylindrical body and a piezoelectric element in the first preferred embodiment of the present invention, the first comparative example, and the second comparative example.

FIG. 5 is a diagram illustrating vibration displacement and the stress distribution in the vibration device of the first comparative example. FIG. 6 is a diagram illustrating vibration displacement and the stress distribution in the vibration device of the second comparative example. FIG. 7 is a diagram illustrating vibration displacement and the stress distribution in the vibration device according to the first preferred embodiment. FIG. 8 is a graph illustrating a relationship between a position in the radial direction and the stress applied to the bonding interface between the cylindrical body and the piezoelectric element in the first preferred embodiment, the first comparative example, and the second comparative example. Note that FIG. 5 to FIG. 7 illustrate a portion corresponding to a half of the cross section illustrated in FIG. 1. A point 0 m in the horizontal axis of FIG. 8 corresponds to a position of an end portion on the radially inner side of the piezoelectric element. A point located at about 0.003 m along the horizontal axis of FIG. 8 corresponds to a position of an end portion on the radially outer side of the piezoelectric element.

As illustrated in FIG. 5, in the first comparative example, it is understood that a large stress is applied to the second opening end surface 103b of the cylindrical body 103. Note that the maximum amount of displacement of the light-transmissive cover 2 is about 26.2 μm, for example. As illustrated in FIG. 6, it is understood that also in the second comparative example, a relatively large stress is applied to the second opening end surface 103b. In a case where the thickness of the buffer layer 105 is constant or substantially constant in the radial direction as in the second comparative example, the stress is not sufficiently small. Note that the maximum amount of displacement of the light-transmissive cover 2 is about 22.2 μm, for example. Thus, in the second comparative example, the maximum amount of displacement of the light-transmissive cover 2 is significantly smaller than that in the first comparative example.

In contrast, as illustrated in FIG. 7, in the first preferred embodiment, stress applied to the second opening end surface 3b of the cylindrical body 3 can be effectively reduced. Note that it is understood that stress applied to the buffer layer 5 is also small. Further, the maximum amount of displacement of the light-transmissive cover 2 is about 23.6 μm, for example. Thus, it can be seen that in the first preferred embodiment, the maximum amount of displacement of the light-transmissive cover 2 is larger than that in the second comparative example.

As illustrated in FIG. 8, in the first preferred embodiment, the first comparative example, and the second comparative example, the stress applied to the bonding interface between the cylindrical body and the piezoelectric element increases as the position of the end portion on the radially inner side of the piezoelectric element gets closer. Regardless of this, in the first preferred embodiment, the stress is reduced more than in the first comparative example at any position. In the first preferred embodiment, the stress is reduced by as much as about 30% as compared with the first comparative example.

On the other hand, at the position of the end portion on the radially outer side of the piezoelectric element, the stress is equivalent in the first preferred embodiment and the second comparative example. It can be seen that the stress is further reduced in the first preferred embodiment than in the second comparative example on the radially inner side rather than on the end portion.

As illustrated in FIG. 1, in the buffer layer 5 of the first preferred embodiment, the thickness of the inner end portion 5e is larger than that of the outer end portion 5f. Therefore, the thickness of the buffer layer 5 is relatively large in a portion in which the stress applied to the bonding interface between the cylindrical body 3 and the piezoelectric element 4 is large. As such, stress can be effectively reduced in a portion to which a large stress is applied. Therefore, in the first preferred embodiment, it is possible to effectively reduce the stress applied to the bonding interface between the cylindrical body 3 and the piezoelectric element 4 as compared with the second comparative example.

In the first preferred embodiment, the stress applied to the above-described bonding interface can be reduced while reducing or preventing a reduction in the maximum amount of displacement of the light-transmissive cover 2. Details of this advantageous effect will be described below by comparing the first preferred embodiment and the second comparative example.

Here, a distance between the inner end portion and the outer end portion of the buffer layer is defined as a width L. The thickness of the buffer layer is defined as T, and the maximum thickness of the buffer layer is defined as $T_M$. In the vibration device 1 having the configuration of the first preferred embodiment, the stress applied to the bonding interface between the cylindrical body 3 and the piezoelectric element 4 and the maximum amount of displacement of the light-transmissive cover 2 were measured while changing the maximum thickness $T_M$ of the buffer layer 5. Similarly, in the second comparative example, the stress applied to the bonding interface between the cylindrical body 103 and the piezoelectric element 4 and the maximum amount of displacement of the light-transmissive cover 2 were measured while changing the thickness T of the buffer layer 105.

Table 1 shows design parameters of the vibration device having the configuration of the first preferred embodiment and the vibration device of the second comparative example. Note that in the first preferred embodiment and the second comparative example, L=about 3 mm is set.

TABLE 1

| | Young's Modulus (GPa) | Poisson's Ratio | Density (g/cm$^3$) | Linear Expansion Coefficient (ppm/° C.) | Qm |
|---|---|---|---|---|---|
| Light-transmissive Cover | 73 | 0.221 | 2.5 | 9.3 | 1500 |
| Cylindrical Body | 200 | 0.3 | 7.8 | 10.3 | 1500 |
| Piezoelectric Body | — | — | 7.8 | 5 or less | 1288 |
| Buffer Layer | 159 | 0.3 | 8.4 | 5.2 | 100 |

Figure 9:
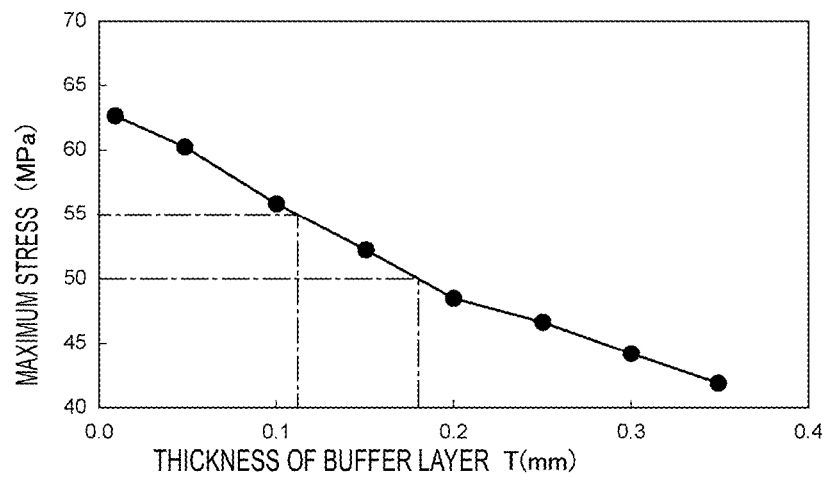
FIG. 9 is a graph illustrating a relationship between a thickness of a buffer layer and the stress applied to the bonding interface between the cylindrical body and the piezoelectric element in the second comparative example.
Figure 10:
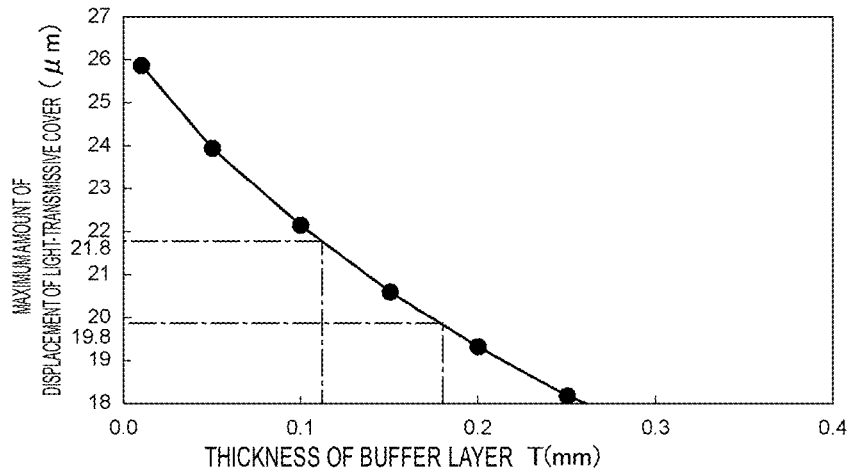
FIG. 10 is a graph illustrating a relationship between the thickness of the buffer layer and a maximum amount of displacement of a light-transmissive cover in the second comparative example.
Figure 11:
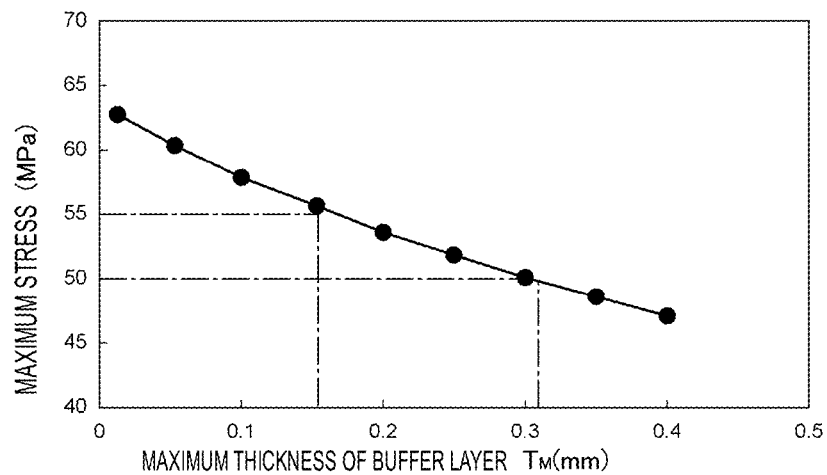
FIG. 11 is a graph illustrating a relationship between a maximum thickness of a buffer layer and the stress applied to the bonding interface between the cylindrical body and the piezoelectric element in the first preferred embodiment of the present invention.
Figure 12:
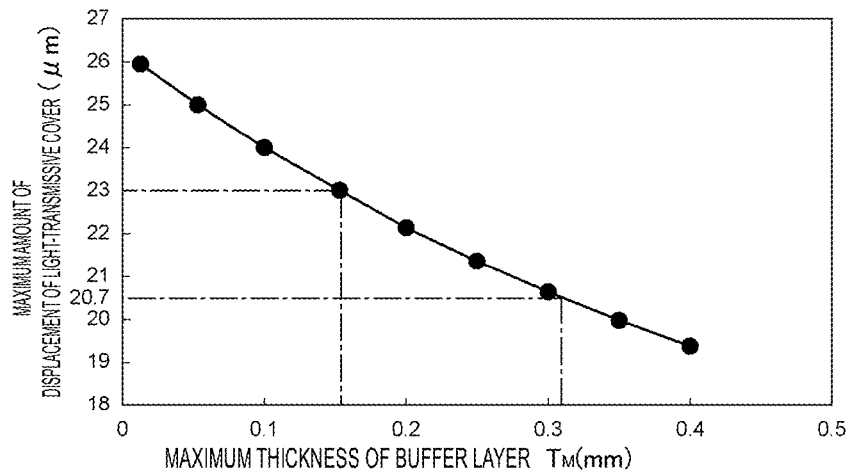
FIG. 12 is a graph illustrating a relationship between the maximum thickness of the buffer layer and a maximum amount of displacement of a light-transmissive cover in the first preferred embodiment of the present invention.

FIG. 9 is a graph illustrating a relationship between the thickness of the buffer layer and the stress applied to the bonding interface between the cylindrical body and the piezoelectric element in the second comparative example. FIG. 10 is a graph illustrating a relationship between the thickness of the buffer layer and the maximum amount of displacement of the light-transmissive cover in the second comparative example. FIG. 11 is a graph illustrating a relationship between the maximum thickness of the buffer layer and the stress applied to the bonding interface between the cylindrical body and the piezoelectric element in the first preferred embodiment. FIG. 12 is a graph illustrating a relationship between the maximum thickness of the buffer layer and the maximum amount of displacement of the light-transmissive cover in the first preferred embodiment. Note that in the second comparative example, the thickness of the buffer layer is constant or substantially constant in the radial direction. Therefore, the horizontal axis in FIG. 9 and FIG. 10 represents the thickness of the buffer layer.

As illustrated in FIG. 9, in the second comparative example, when the thickness of the buffer layer 105 is about 0.17 mm, the maximum stress applied to the bonding interface between the cylindrical body 103 and the piezoelectric element 4 is about 50 MPa. At this time, as illustrated in FIG. 10, the maximum amount of displacement of the light-transmissive cover 2 is about 19.8 μm. On the other hand, as illustrated in FIG. 11 and FIG. 12, in the first preferred embodiment, when the maximum stress applied to the bonding interface between the cylindrical body 3 and the piezoelectric element 4 is about 50 MPa, the maximum amount of displacement of the light-transmissive cover 2 is about 20.7 μm. As described above, when the stress applied to the above-described bonding interface is the same or substantially the same in the first preferred embodiment and the second comparative example, the maximum amount of displacement in the first preferred embodiment is larger than the maximum amount of displacement in the second comparative example.

As another example, as illustrated in FIG. 9 and FIG. 10, in the second comparative example, when the maximum stress applied to the bonding interface between the cylindrical body 103 and the piezoelectric element 4 is about 55 MPa, the maximum amount of displacement of the light-transmissive cover 2 is about 21.8 μm. On the other hand, as illustrated in FIG. 11 and FIG. 12, in the first preferred embodiment, when the stress applied to the bonding interface between the cylindrical body 3 and the piezoelectric element 4 is about 55 MPa, the maximum amount of displacement of the light-transmissive cover 2 is as large as about 23 μm. As described above, in the first preferred embodiment, it is possible to reduce the stress applied to the bonding interface while reducing or preventing a reduction in the maximum amount of displacement of the light-transmissive cover 2.

In the first preferred embodiment, even when the stress applied to the above-described bonding interface is reduced, the maximum amount of displacement of the light-transmissive cover 2 is larger. In this way, the sensitivity of the maximum amount of displacement of the light-transmissive cover 2 with respect to the stress applied to the above-described bonding interface can be reduced.

Figure 13:
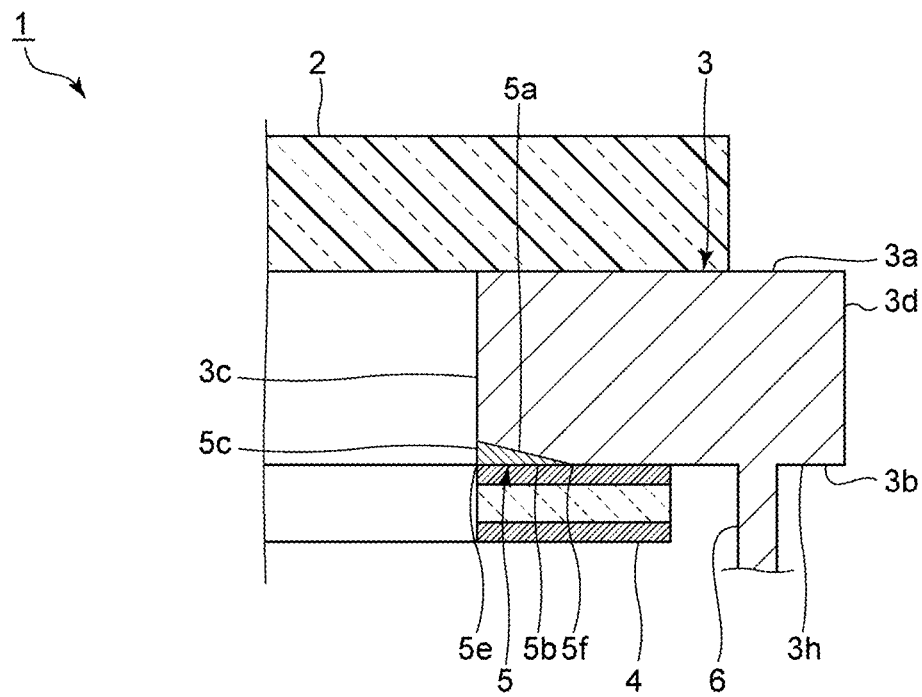
FIG. 13 is a front cross-sectional view illustrating the vicinity of the buffer layer in an example in which a width of the buffer layer is narrow in the first preferred embodiment of the present invention.

In the first preferred embodiment, the inner end portion 5e of the buffer layer 5 and the end portion on the radially inner side of the piezoelectric element 4 overlap each other in a plan view. In a plan view, the outer end portion 5f of the buffer layer and the end portion on the radially outer side of the piezoelectric element 4 overlap each other. However, the arrangement of the buffer layer 5 is not limited thereto. For example, in the case illustrated in FIG. 13, the outer end portion 5f of the buffer layer 5 is positioned on the radially inner side relative to the end portion on the radially outer side of the piezoelectric element 4. Alternatively, although not illustrated, the outer end portion 5f of the buffer layer 5 may be positioned on the radially outer side relative to the end portion on the radially outer side of the piezoelectric element 4.

In the vibration device 1 of the first preferred embodiment, in the case illustrated in FIG. 3, the piezoelectric element 4 is indirectly bonded to the cylindrical body 3 with the buffer layer 5 interposed therebetween. On the other hand, in the case illustrated in FIG. 13, the vibration device 1 includes a portion in which the piezoelectric element 4 is directly bonded to the cylindrical body and a portion in which the piezoelectric element 4 is indirectly bonded to the cylindrical body.

Here, in the vibration device 1 having the configuration of the first preferred embodiment, the stress applied to the bonding interface between the cylindrical body 3 and the piezoelectric element 4 and the maximum amount of displacement of the light-transmissive cover 2 were measured while changing the width L and the maximum thickness $T_M$ of the buffer layer 5. Note that the dimensions of components other than the buffer layer 5 in the vibration device 1 are constant or substantially constant. The displacement obtained by normalizing the maximum amount of displacement of the light-transmissive cover 2 by the stress applied to the bonding interface is defined as a normalized maximum amount of displacement. The normalized maximum amount of displacement was calculated every time the width L and the maximum thickness $T_M$ were changed. Similarly, in the second comparative example illustrated in FIG. 4, the normalized maximum amount of displacement was calculated every time the width L and the thickness T of the buffer layer 105 were changed. A large normalized maximum amount of displacement indicates excellent performance as a vibration device. More specifically, since the normalized maximum amount of displacement is obtained by normalizing the maximum amount of displacement by a stress value, the normalized maximum amount of displacement is inversely proportional to the stress value. Therefore, a large normalized maximum amount of displacement means that the displacement of the vibration of the light-transmissive cover 2 is large even when the stress applied to the above-described bonding interface is small.

Figure 14:
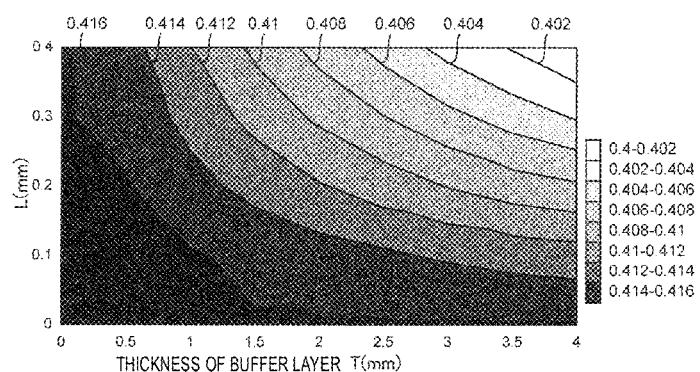
FIG. 14 is a graph illustrating a relationship between a width L and a thickness T of the buffer layer and a normalized maximum amount of displacement in the second comparative example.
Figure 15:
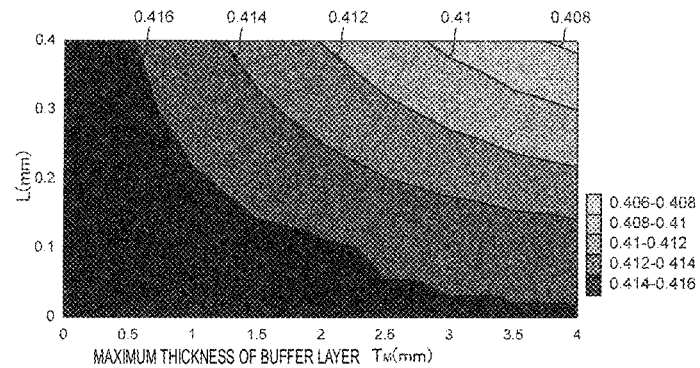
FIG. 15 is a graph illustrating a relationship between the width L and a maximum thickness $T_M$ of the buffer layer and the normalized maximum amount of displacement in the first preferred embodiment of the present invention.

FIG. 14 is a graph illustrating the relationship between the width L and the thickness T of the buffer layer and the normalized maximum amount of displacement in the second comparative example. FIG. 15 is a graph illustrating a relationship between the width L and the maximum thickness $T_M$ of the buffer layer and the normalized maximum amount of displacement in the first preferred embodiment. Note that in FIG. 14 and FIG. 15, the normalized maximum amount of displacement is represented by a gray scale and a contour line in each region.

As illustrated in FIG. 14, in the second comparative example, as the value of the width L and the value of the thickness T of the buffer layer 105 increase, the normalized maximum amount of displacement decreases. Here, in FIG. 14, a distance between the contour lines of the normalized maximum amount of displacement is short. This indicates that the change in the normalized maximum amount of displacement with respect to the change in the width L or the thickness T is large. Thus, in the second comparative example, the sensitivity of the normalized maximum amount of displacement with respect to the shape of the buffer layer 105 is high.

On the other hand, as illustrated in FIG. 15, in the first preferred embodiment, the distance between the contour lines of the normalized maximum amount of displacement is long. Thus, in the first preferred embodiment, the sensitivity of the normalized maximum amount of displacement with respect to the shape of the buffer layer 5 is low. Therefore, variations in products can be reduced.

In FIG. 14 and FIG. 15, when the cases where the width L is the same or substantially the same and the thickness T and the maximum thickness $T_M$ are the same or substantially the same are compared, it is discovered that the normalized maximum amount of displacement in the first preferred embodiment is equal to or larger than the normalized maximum amount of displacement in the second comparative example. Further, in a region where the value of the width L and the value of the thickness T or the maximum thickness $T_M$ are large, the normalized maximum amount of displacement in the first preferred embodiment is larger than the normalized maximum amount of displacement in the second comparative example. In addition, as illustrated in FIG. 15, in the first preferred embodiment, it is understood that the region in which the normalized maximum amount of displacement is large is wide, and the performance as the vibration device is excellent.

It is preferable that the buffer layer 5 and the cylindrical body 3 are integrated with each other. Thus, the buffer layer 5 and the cylindrical body 3 are not significantly separated from each other. In the present specification, the buffer layer 5 is integrated with another component means that the buffer layer 5 is provided as a result of the other component being surface-treated. Examples of the surface treatment include a coating treatment, a plating treatment, or the like. Note that the coating treatment can be performed by, for example, thermal spray processing or the like.

When the buffer layer 5 and the cylindrical body 3 are integrated, it is preferable to use thermal spray processing. Thermal spray processing refers to forming a coating by heating and melting a solid substance and spraying it onto the surface of a substrate. Before the buffer layer 5 is formed by thermal spray processing, the inclined portion 3g of the cylindrical body 3 is preferably subjected to blasting. By the blast treatment, the inclined portion 3g becomes a rough surface. Thus, close contact performance between the buffer layer 5 formed by thermal spray processing and the cylindrical body 3 can be effectively increased. Thus, bonding force between the buffer layer 5 and the cylindrical body 3 can be effectively increased. After the buffer layer 5 is formed by thermal spray processing, it is preferable to polish the second surface 5b side of the buffer layer 5. As such, the second surface 5b can be suitably smoothed.

Thermal spray processing can be applied to a wide range of coating thicknesses. Therefore, when thermal spray processing is used, the degree of freedom in designing the buffer layer 5 can be increased. Furthermore, in thermal spray processing, there is a wide range of materials that can be applied as a material to be thermally sprayed and a material of a substrate. Therefore, the degree of freedom in designing the cylindrical body 3 and the buffer layer 5 can be further increased.

An arithmetic mean roughness (Ra) of the inclined portion 3g of the cylindrical body 3 is preferably equal to or more than about 3.2 μm and equal to or less than about 25 μm, for example. As described above, since the inclined portion 3g is a rough surface, it is possible to increase the bonding force between the cylindrical body 3 and the buffer layer 5 in the case of using the thermal spray processing. The arithmetic mean roughness in the present specification is based on JIS B 0601:2013.

On the other hand, the arithmetic mean roughness of the inclined portion 3g of the cylindrical body 3 is preferably equal to or less than about 0.2 μm, for example. Also in this case, when, for example, plating treatment, vapor deposition, sputtering or the like is used, the bonding force between the cylindrical body 3 and the buffer layer 5 can be increased.

The arithmetic mean roughness of the second surface 5b of the buffer layer 5 is preferably equal to or more than about 0.8 μm and equal to or less than about 6.3 μm, for example. As such, the bonding force between the buffer layer 5 and the piezoelectric element 4 can be suitably increased.

For example, in a case where an adhesive layer is provided between the cylindrical body 3 and the buffer layer 5, there is a possibility that absorption of vibration by the adhesive layer occurs. In contrast, in the first preferred embodiment, the cylindrical body 3 and the buffer layer 5 are directly bonded to each other without using an adhesive. Therefore, in the first preferred embodiment, absorption of vibration by the adhesive layer does not occur. Therefore, a vibration efficiency of the light-transmissive cover 2 can be improved.

The buffer layer 5 is preferably thickest at the inner end portion 5e. Thus, the stress applied to the bonding interface between the cylindrical body 3 and the piezoelectric element 4 can be effectively reduced. It is more preferable that the thickness of the buffer layer 5 increase as the buffer layer 5 extends toward the inner end portion 5e side. As a result, it is possible to effectively reduce or prevent a reduction in the vibration efficiency.

The material of the buffer layer 5 is preferably a material having a high Qm. As such, a loss can be reduced, and the light-transmissive cover 2 can be efficiently vibrated. Additionally, the material of the buffer layer 5 is preferably a conductive material. Thus, the cylindrical body 3 and the piezoelectric element 4 can be electrically connected to each other. Therefore, the cylindrical body 3 can be used as a portion of a wiring of the piezoelectric element 4, and the degree of freedom of the wiring can be increased. As the material of the buffer layer 5, for example, SUS420J2, SUS440C, SUS430, Kovar, 42Ni, or the like is preferably used.

Here, when a coefficient of linear expansion of the piezoelectric body 13 is defined as $\alpha 1$, a coefficient of linear expansion of the cylindrical body 3 is defined as $\alpha 2$, and a coefficient of linear expansion of the buffer layer 5 is defined as $\alpha$, $\alpha 1 < \alpha < \alpha 2$ is preferable. Note that $\alpha 1 < \alpha < \alpha 2$ means that the value of $\alpha$ is a value between $\alpha 1$ and $\alpha 2$. In a case where the coefficient of linear expansion of the piezoelectric body 13 is equal to or less than about 5 ppm/° C., it is particularly preferable to use, for example, Kovar or 42Ni as the material of the buffer layer 5. Thus, the coefficients of linear expansion of the piezoelectric element 4 and the buffer layer 5 can be closer to each other. Therefore, separation between the piezoelectric element 4 and the buffer layer 5 is unlikely to occur. Therefore, the reliability of the vibration device 1 can be improved.

As described above, the piezoelectric element 4 includes the first electrode 14a. Therefore, the piezoelectric body 13 is indirectly bonded to the cylindrical body 3 with the first electrode 14a interposed therebetween. Note that in a case where the buffer layer 5 and the cylindrical body 3 are made of metal, the buffer layer 5 and the cylindrical body 3 can also be used as the first electrode of the piezoelectric element 4. Therefore, in this case, the piezoelectric element 4 may not include the first electrode 14a.

As illustrated in FIG. 3, the inclined portion 3g of the second opening end surface 3b of the cylindrical body 3 has a linear shape in a cross section along the axial direction Z. Note that the inclined portion 3g may have a curved shape in the cross section. In this case, the first surface 5a of the buffer layer 5 may also have a curved shape in the cross section.

Hereinafter, the configuration of the holding member 6 will be described in detail. As illustrated in FIG. 1, the holding member 6 includes the spring portion 17 and the bottom portion 18. The spring portion 17 has a shape in which two cylindrical shapes are connected in a stepped manner. To be more specific, the spring portion 17 includes a first portion 17a, a second portion 17b, and a third portion 17c. The first portion 17a and the third portion 17c have a cylindrical shape. The first portion 17a and the third portion 17c extend in the axial direction Z. The second portion 17b has an annular shape. The second portion 17b connects the first portion 17a and the third portion 17c. The first portion 17a is connected to the cylindrical body 3. The bottom portion 18 is connected to the third portion 17c. An outer diameter of the first portion 17a is smaller than an outer diameter of the third portion 17c. However, the outer diameter of the first portion 17a may also be greater than the outer diameter of the third portion 17c.

Here, a thickness along a direction orthogonal or substantially orthogonal to a direction in which each portion of the holding member 6 extends is defined as the thickness of each portion of the holding member 6. In the holding member 6, the thickness of the spring portion 17 is smaller than the thickness of the bottom portion 18. Accordingly, the spring portion 17 is more easily deformed than the bottom portion 18. Thus, a radial component of the vibration is absorbed by a spring property of the spring portion 17. Note that the absorption of the vibration by the spring portion 17 means that most of the vibration propagated from the piezoelectric element 4 to the holding member 6 can be the vibration in the spring portion 17. This makes it possible for the vibration to hardly be leaked to the bottom portion 18.

In addition, since the thickness of the bottom portion is large, the bottom portion 18 itself is hardly deformed. Therefore, leakage of vibration to the bottom portion 18 of the holding member 6 can be effectively reduced or prevented. Therefore, in a case where the bottom portion 18 is fixed to the outside or the like, vibration damping can be effectively reduced or prevented.

Note that the spring portion 17 may not include the first portion 17a, the second portion 17b, and the third portion 17c. The cross-sectional shape of the spring portion 17 along the axial direction Z may be, for example, a linear shape.

Figure 16:
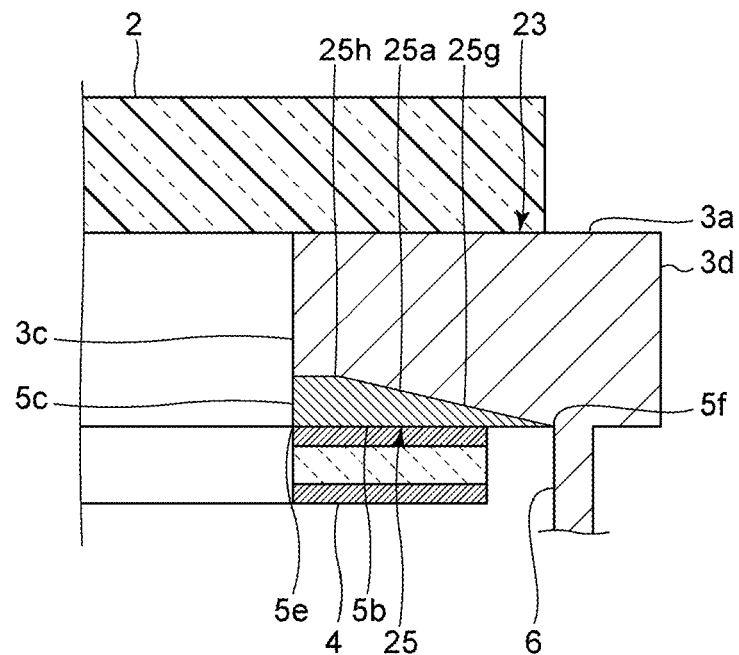
FIG. 16 is a front cross-sectional view illustrating the vicinity of a buffer layer of a vibration device according to a modification of the first preferred embodiment of the present invention.

As illustrated in FIG. 3, the entire first surface 5a of the buffer layer 5 is inclined with respect to the radial direction. However, the first surface 5a of the buffer layer 5 may include a portion parallel or substantially parallel to the radial direction. In a modification of the first preferred embodiment illustrated in FIG. 16, a first surface 25a of a buffer layer 25 includes an inclined portion 25g and a non-inclined portion 25h. The inclined portion 25g is inclined with respect to the radial direction. The non-inclined portion 25h is parallel or substantially parallel to the radial direction. In the inclined portion 25g, as in the first preferred embodiment, a thickness of the buffer layer 25 becomes larger as the buffer layer 25 extends toward the inner end portion 5e. In the non-inclined portion 25h, the thickness of the buffer layer 25 is constant or substantially constant in the radial direction. An end portion on a radially inner side of the non-inclined portion 25h is connected to the inner surface 5c. An end portion on a radially outer side of the non-inclined portion 25h is connected to the inclined portion 25g. In a plan view, a portion in which the non-inclined portion 25h and the inclined portion 25g are connected to each other overlaps the piezoelectric element 4.

The outer end portion 5f of the buffer layer 25 is located on the radially outer side relative to the end portion on the radially outer side of the piezoelectric element 4. Note that the outer end portion 5f is positioned at the end portion on the radially inner side of a portion in which a cylindrical body 23 is connected to the holding member 6. Also in this modification, as in the first preferred embodiment, it is possible to reduce the stress applied to a bonding interface between the cylindrical body 23 and the piezoelectric element 4. Therefore, it is possible to reduce or prevent damage to the vibration device due to stress during vibration.

As described above, in the present specification, "the buffer layer 5 and another component are integrated" means that the buffer layer 5 is provided due to the other component being surface-treated. In the first preferred embodiment, the buffer layer 5 and the cylindrical body 3 are integrated with each other. Note that the buffer layer 5 and the piezoelectric element 4 may be integrated.

Figure 17:
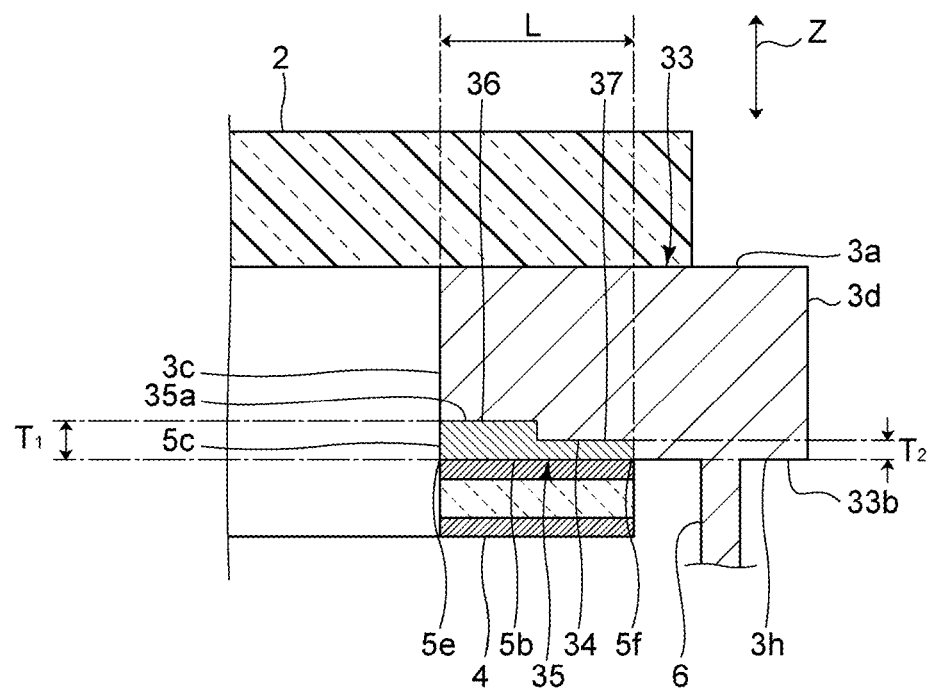
FIG. 17 is a front cross-sectional view illustrating the vicinity of a buffer layer of a vibration device according to a second preferred embodiment of the present invention.

FIG. 17 is a front cross-sectional view illustrating the vicinity of a buffer layer of a vibration device according to a second preferred embodiment of the present invention.

The second preferred embodiment is different from the first preferred embodiment in that a buffer layer 35 does not include a portion inclined with respect to the radial direction. Further, the second preferred embodiment is different from the first preferred embodiment in the shape of the portion of the cylindrical body 33 bonded to the buffer layer 35. Except for the above points, the vibration device of the second preferred embodiment has the same or substantially the same configuration as the vibration device 1 of the first preferred embodiment.

The cross-sectional shape of the buffer layer 35 along the axial direction Z is a stepped shape. The buffer layer 35 includes a first step portion 36 and a second step portion 37. In each of the first step portion 36 and the second step portion 37, a thickness of the buffer layer 35 is constant or substantially constant in the radial direction. When a thickness of the first step portion 36 is defined as $T_1$ and a thickness of the second step portion 37 is defined as $T_2$, the relationship of $T_1 > T_2$ satisfied. The first step portion 36 includes the inner surface 5c. An end portion on the radially inner side of the first step portion 36 is the inner end portion 5e of the buffer layer 35. An end portion on the radially outer side of the second step portion 37 is the outer end portion 5f of the buffer layer 35. Therefore, the thickness of the inner end portion 5e of the buffer layer 35 is larger than that of the outer end portion 5f.

As described above, the buffer layer 35 includes the first step portion 36 and the second step portion 37. Therefore, the first surface 35a includes an uneven portion. The second surface 5b is flat.

The cylindrical body 33 includes a stepped portion 34. A buffer layer 35 is bonded to the stepped portion 34. Thus, the second surface 5b of the buffer layer 35 and the non-inclined portion 3h of the second opening end surface 33b of the cylindrical body 3 are flush with each other.

The thickness of the buffer layer 35 is relatively large in a portion in which stress applied to the bonding interface between the cylindrical body 33 and the piezoelectric element 4 is large. Therefore, as in the first preferred embodiment, the stress applied to the bonding interface between the cylindrical body 33 and the piezoelectric element 4 can be reduced. Therefore, it is possible to reduce or prevent damage to the vibration device due to stress during vibration.

Furthermore, in the second preferred embodiment, it is possible to reduce the stress applied to the bonding interface while reducing or preventing a reduction in the maximum amount of displacement of the light-transmissive cover 2. Details of this advantageous effect are provided below.

In the vibration device having the configuration of the second preferred embodiment, the stresses applied to the bonding interface between the cylindrical body 33 and the piezoelectric element 4 and the maximum amount of displacement of the light-transmissive cover 2 were measured while changing the thicknesses $T_1$ of the first step portion 36. The design parameters of the vibration device having the configuration of the second preferred embodiment are the same or substantially the same as those shown in above-described Table 1. Here, a width of the first step portion 36 is defined as $L_1$, and a width of the second step portion 37 is defined as $L_2$. $L_1=L_2=$about 1.5 mm is set. $T_2=$about 0.05 mm is set.

Figure 18:
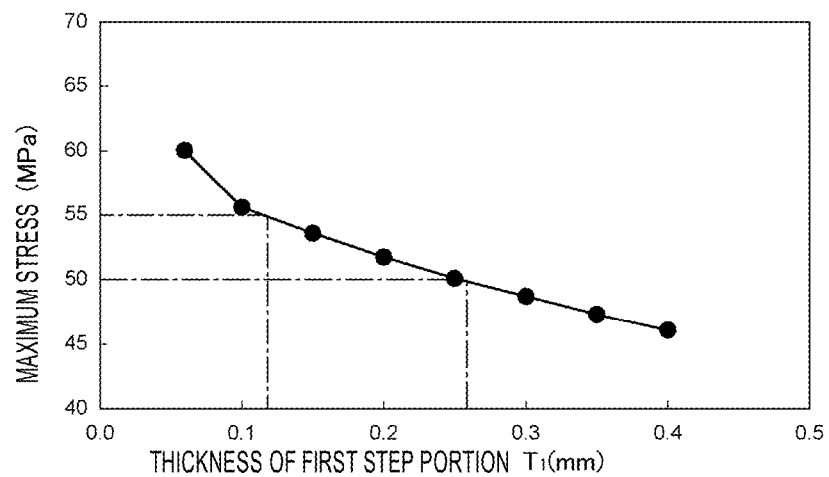
FIG. 18 is a graph illustrating a relationship between a thickness of a first step portion of the buffer layer and stress applied to a bonding interface between the cylindrical body and the piezoelectric element in the second preferred embodiment of the present invention.
Figure 19:
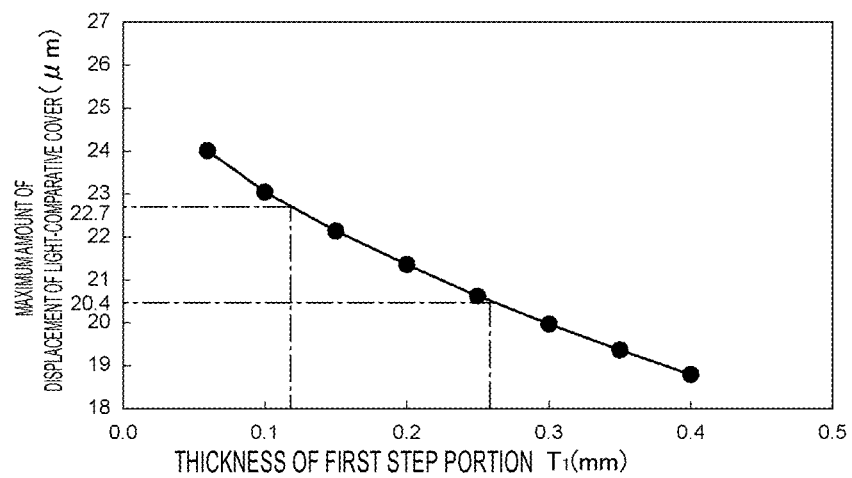
FIG. 19 is a graph illustrating a relationship between the thickness of the first step portion of the buffer layer and the maximum amount of displacement of the light-transmissive cover in the second preferred embodiment of the present invention.

FIG. 18 is a graph illustrating a relationship between the thickness of the first step portion of the buffer layer and the stress applied to the bonding interface between the cylindrical body and the piezoelectric element in the second preferred embodiment. FIG. 19 is a graph illustrating a relationship between the thickness of the first step portion of the buffer layer and the maximum amount of displacement of the light-transmissive cover in the second preferred embodiment.

As illustrated in FIG. 18 and FIG. 19, when the maximum stress applied to the bonding interface between the cylindrical body 33 and the piezoelectric element 4 is about 50 MPa, the maximum amount of displacement of the light-transmissive cover 2 is about 20.4 μm. When the maximum stress applied to the above-described bonding interface is about 55 MPa, the maximum amount of displacement of the light-transmissive cover 2 is about 22.7 μm. This result and the results of the above-described first preferred embodiment and the second comparative example are also shown in Table 2.

TABLE 2

| | Maximum Displacement Amount (μm) | | |
|---|---|---|---|
| | First Preferred Embodiment | Second Preferred Embodiment | Second Comparative Example |
| Maximum Stress 50 MPa | 20.7 | 20.4 | 19.8 |
| Maximum Stress 55 MPa | 23 | 22.7 | 21.8 |

As shown in Table 2, the maximum amount of displacement in the second preferred embodiment is larger than the maximum amount of displacement in the second comparative example in both cases where the stresses applied to the bonding interface between the cylindrical body 33 and the piezoelectric element 4 are about MPa and about 55 MPa. As described above, in the second preferred embodiment, it is possible to reduce the stress applied to the bonding interface while reducing or preventing a reduction in the maximum amount of displacement of the light-transmissive cover 2.

Note that it is understood that the maximum amount of displacement of the light-transmissive cover 2 is larger in the first preferred embodiment than in the second preferred embodiment. As in the first preferred embodiment, it is preferable that the thickness of the buffer layer 5 increases as the buffer layer 5 extends toward the inner end portion 5e side. As a result, the stress applied to the bonding interface can be reduced while further reducing or preventing a reduction in the maximum amount of displacement of the light-transmissive cover 2.

Note that, also in the second preferred embodiment, the thickness of the first step portion 36 may increase as the first step portion 36 extends toward the inner end portion side, for example. The thickness of the second step portion 37 may also increase as the second step portion 37 extends toward the inner end portion side, for example. In the second preferred embodiment, the buffer layer 35 includes two step portions. However, the buffer layer 35 may include three or more step portions.

Figure 20:
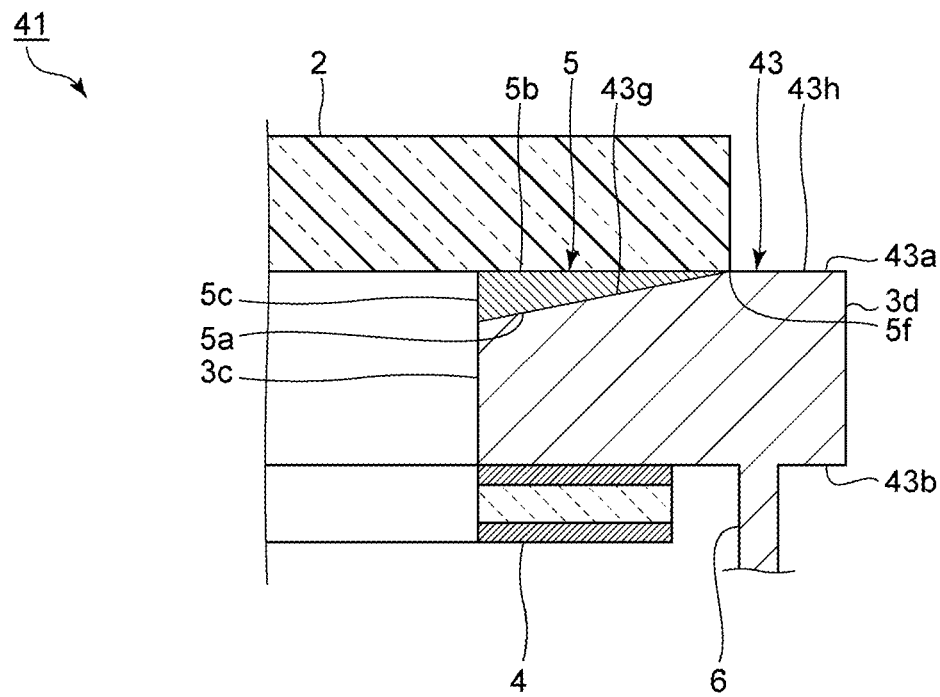
FIG. 20 is a front cross-sectional view illustrating the vicinity of a buffer layer of a vibration device according to a third preferred embodiment of the present invention.

FIG. 20 is a front cross-sectional view illustrating the vicinity of the buffer layer of a vibration device according to a third preferred embodiment of the present invention.

The third preferred embodiment is different from the first preferred embodiment in that the buffer layer 5 is provided between a cylindrical body 43 and the light-transmissive cover 2 and in the configuration of the cylindrical body 43. Except for the above points, a vibration device 41 of the present preferred embodiment has the same or substantially the same configuration as the vibration device 1 of the first preferred embodiment.

A first opening end surface 43a of the cylindrical body 43 includes an inclined portion 43g and a non-inclined portion 43h. The first opening end surface 43a is inclined in the inclined portion 43g so as to approach a second opening end surface 43b as the first opening end surface 43a extends toward the radially inner side. An end portion on the radially inner side of the inclined portion 43g is connected to the inner surface 3c. An end portion on the radially outer side of the inclined portion 43g is connected to the non-inclined portion 43h. An end portion on the radially outer side of the non-inclined portion 43h is connected to the outer surface 3d.

The second opening end surface 43b is flat. The piezoelectric element 4 is directly bonded to the second opening end surface 43b of the cylindrical body 43.

The buffer layer 5 is bonded to the inclined portion 43g of the first opening end surface 43a of the cylindrical body 43. The first surface 5a of the buffer layer 5 is bonded to the inclined portion 43g of the cylindrical body 43. The second surface 5b of the buffer layer 5 and the non-inclined portion 43h of the first opening end surface 43a of the cylindrical body 43 are flush with each other. The inner surface 5c of the buffer layer 5 and the inner surface 3c of the cylindrical body 43 are flush with each other. The light-transmissive cover 2 is bonded to the second surface 5b of the buffer layer 5. In the third preferred embodiment, the light-transmissive cover 2 is indirectly bonded to the cylindrical body 43 with the buffer layer 5 interposed therebetween.

In the bonding interface between the cylindrical body 43 and the light-transmissive cover 2, the stress applied thereto increases toward the radially inner side. In the buffer layer 5 of the third preferred embodiment, the thickness of the inner end portion 5e is larger than that of the outer end portion 5f. Therefore, the thickness of the buffer layer 5 is relatively large in a portion in which the stress applied to the bonding interface between the cylindrical body 43 and the light-transmissive cover 2 is large. As a result, it is possible to effectively reduce the stress in the portion to which a large stress is applied. Therefore, the stress applied to the bonding interface between the cylindrical body 43 and the light-transmissive cover 2 can be reduced. Therefore, damage to the vibration device 41 due to stress during vibration can be reduced or prevented. Note that the bonding interface between the cylindrical body 43 and the light-transmissive cover 2 in the third preferred embodiment is a bonding interface with the buffer layer 5 interposed therebetween.

The shape of the buffer layer 5 is not limited to the above. For example, the buffer layer 25 illustrated in FIG. 16 or the buffer layer 35 illustrated in FIG. 17 may be provided between the light-transmissive cover 2 and the cylindrical body 43.

Here, when a coefficient of linear expansion of the cylindrical body 43 is defined as $\alpha 2$, a coefficient of linear expansion of the light-transmissive cover 2 is defined as $\alpha 3$, and a coefficient of linear expansion of the buffer layer 5 is defined as $\alpha$, a relationship of $\alpha 3 < \alpha < \alpha 2$, for example, is preferable. In a case where soda-lime-based glass is used as the material of the light-transmissive cover 2, it is particularly preferable to use, for example, SUS420J2, SUS440C, or SUS430 as the material of the buffer layer 5. On the other hand, in a case where borosilicate glass is used as the material of the light-transmissive cover 2, it is particularly preferable to use, for example, Kovar or 42Ni as the material of the buffer layer 5. Accordingly, the coefficients of linear expansion of the light-transmissive cover 2 and the buffer layer 5 can be made close to each other. Therefore, the light-transmissive cover 2 and the buffer layer 5 are not significantly separated from each other. Therefore, the reliability of the vibration device 41 can be improved.

In the third preferred embodiment, the buffer layer 5 and the cylindrical body 43 are integrated with each other. Note that the buffer layer 5 and the light-transmissive cover 2 may be integrated with each other.

Figure 21:
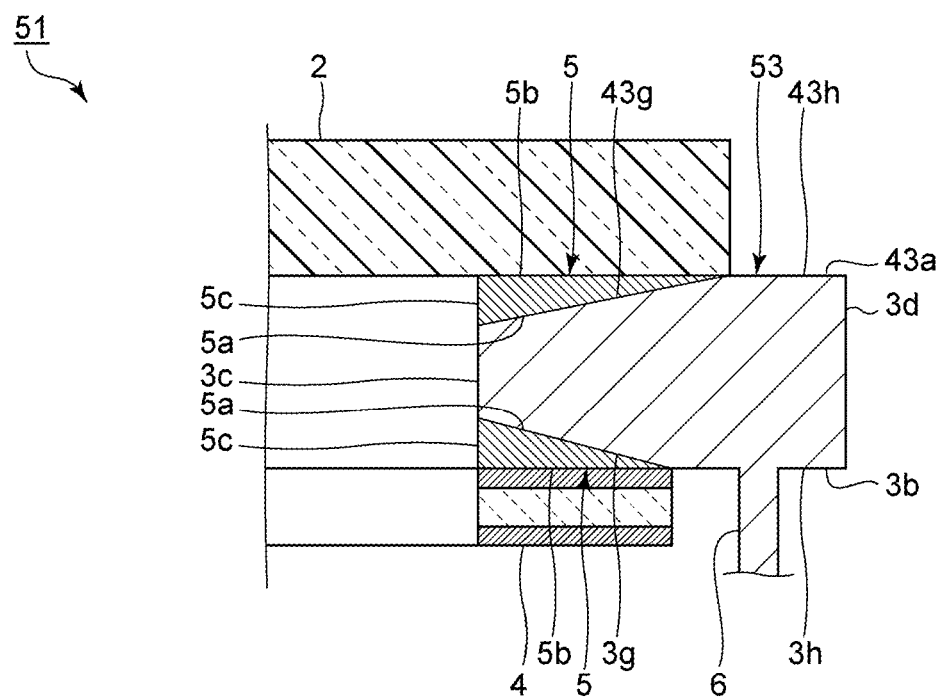
FIG. 21 is a front cross-sectional view illustrating the vicinity of buffer layers of a vibration device according to a fourth preferred embodiment of the present invention.

FIG. 21 is a front cross-sectional view illustrating the vicinity of the buffer layer of a vibration device according to a fourth preferred embodiment of the present invention.

The fourth preferred embodiment is different from the first preferred embodiment in that the buffer layers 5 are provided between a cylindrical body 53 and the piezoelectric element 4 and between the cylindrical body 53 and the light-transmissive cover 2, and in the configuration of the cylindrical body 53. Except for the above points, a vibration device 51 of the preferred embodiment has the same or substantially the same configuration as that of the vibration device 1 of the first preferred embodiment.

The first opening end surface 43a of the cylindrical body 53 includes the inclined portion 43g and the non-inclined portion 43h as in the second preferred embodiment. The second opening end surface 3b includes the inclined portion 3g and the non-inclined portion 3h as in the first preferred embodiment. The first surface 5a of one buffer layer 5 is bonded to the inclined portion 43g of the first opening end surface 43a. The first surface 5a of the other buffer layer 5 is bonded to the inclined portion 3g of the second opening end surface 3b.

In the fourth preferred embodiment, the stress applied to the bonding interface between the cylindrical body 53 and the piezoelectric element 4 can be reduced. Further, it is also possible to reduce the stress applied to the bonding interface between the cylindrical body 53 and the light-transmissive cover 2. Therefore, damage to the vibration device 51 due to stress during vibration can be reduced or prevented.

Figure 22:
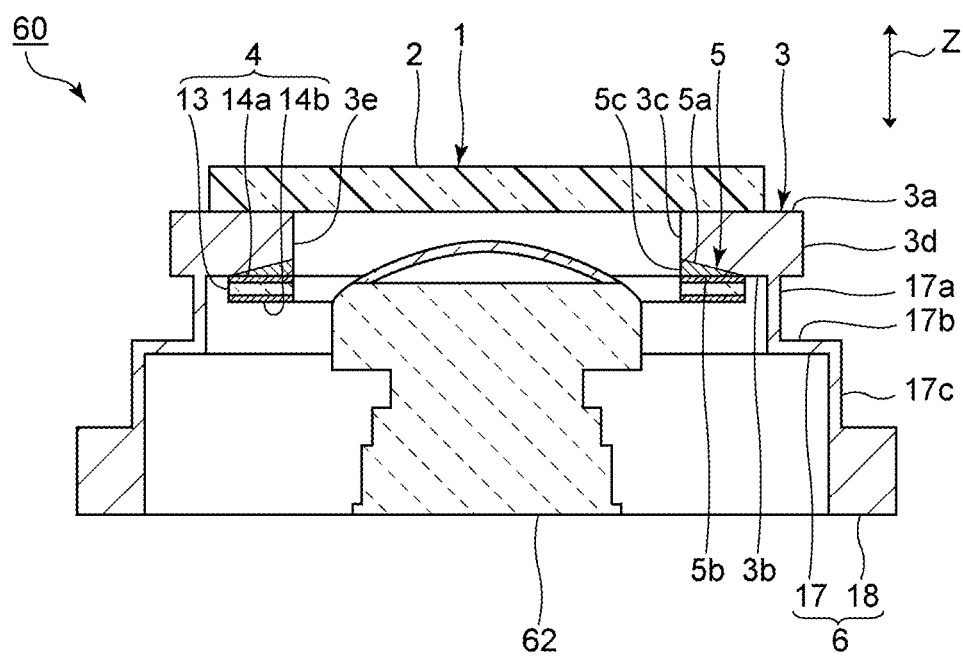
FIG. 22 is a front cross-sectional view of an imaging device according to a fifth preferred embodiment of the present invention.

FIG. 22 is a front cross-sectional view of an imaging device according to a fifth preferred embodiment of the present invention.

As illustrated in FIG. 22, an imaging device 60 as an optical detection apparatus includes the vibration device 1 according to the first preferred embodiment and an imaging element 62 disposed in the internal space of the vibration device 1. Note that the vibration device of the imaging device 60 is not limited to the vibration device 1 of the first preferred embodiment. The vibration device of the imaging device 60 may be, for example, the vibration device of any one of the second to fourth preferred embodiments. The vibration device only needs to be the vibration device according to a preferred embodiment of the present invention.

Examples of the imaging element 62 include a CMOS, a CCD, a bolometer, a thermopile, and the like, for example, that receive light having any wavelength in a visible region to a far-infrared region. Examples of the imaging device 60 include a camera, a Radar, a LIDAR device, and the like, for example.

Note that in the internal space of the vibration device 1, an optical detection element that optically detects an energy ray may be provided other than the imaging element 62. The energy ray to be detected may be, for example, an active energy ray such as an electromagnetic wave, an infrared ray, or the like. A detection region of the optical detection element is included in the light-transmissive cover 2. In the imaging device 60 illustrated in FIG. 22, the field of view of the imaging element 62 as a detection region is included in the light-transmissive cover 2.

Since the imaging device 60 includes the vibration device 1 according to the first preferred embodiment, for example, stress applied to the bonding interface between the cylindrical body 3 and the piezoelectric element 4 can be reduced. Therefore, damage to the vibration device 1 due to stress during vibration can be reduced or prevented. Therefore, the reliability of the imaging device 60 can be improved.

While preferred embodiments of the present invention have been described above, it is to be understood that variations and modifications will be apparent to those skilled in the art without departing from the scope and spirit of the present invention. The scope of the present invention, therefore, is to be solely by the following claims.

What is claimed is:

1. A vibration device comprising:
    a cylindrical body including a cavity, a first opening end surface, and a second opening end surface;
    a light-transmissive cover directly or indirectly bonded to the first opening end surface of the cylindrical body so as to cover the cavity of the cylindrical body;
    a piezoelectric body directly or indirectly bonded to the cylindrical body; and
    a buffer layer between at least one of the cylindrical body and the piezoelectric body, and the cylindrical body and the light-transmissive cover; wherein
    when a direction connecting the first opening end surface and the second opening end surface of the cylindrical body is defined as an axial direction, the buffer layer includes an inner end portion on an inner side portion in a direction orthogonal or substantially orthogonal to the axial direction and an outer end portion on an outer side portion in a direction orthogonal to the axial direction; and
    a thickness of the inner end portion is larger than a thickness of the outer end portion.

2. The vibration device according to claim 1, wherein the buffer layer has an annular shape.

3. The vibration device according to claim 1, wherein the buffer layer has a largest thickness at the inner end portion.

4. The vibration device according to claim 1, wherein the buffer layer includes a portion in which a thickness of the buffer layer increases as the buffer layer extends toward the inner end portion side.

5. The vibration device according to claim 1, wherein the buffer layer and the cylindrical body are integrated with each other.

6. The vibration device according to claim 1, wherein
    the buffer layer includes a first surface and a second surface;
    the first surface is bonded to the cylindrical body;
    the second surface includes a portion facing the first surface; and
    an arithmetic mean roughness of the second surface is equal to or more than about 0.8 μm and equal to or less than about 6.3 μm.

7. The vibration device according to claim 1, wherein the cylindrical body is made of metal.

8. The vibration device according to claim 1, wherein the light-transmissive cover has a disk shape.

9. The vibration device according to claim 1, wherein the light-transmissive cover is made of light-transmitting plastic, quartz, or glass.

10. The vibration device according to claim 1, wherein the buffer layer has an annular shape.

11. An imaging device comprising:
    the vibration device according to claim 1; and
    an imaging element in an internal space of the vibration device.

12. The imaging device according to claim 11, wherein the buffer layer has an annular shape.

13. The imaging device according to claim 11, wherein the buffer layer has a largest thickness at the inner end portion.

14. The imaging device according to claim 11, wherein the buffer layer includes a portion in which a thickness of the buffer layer increases as the buffer layer extends toward the inner end portion side.

15. The imaging device according to claim 11, wherein the buffer layer and the cylindrical body are integrated with each other.

16. The imaging device according to claim 11, wherein
the buffer layer includes a first surface and a second surface;
the first surface is bonded to the cylindrical body;
the second surface includes a portion facing the first surface; and
an arithmetic mean roughness of the second surface is equal to or more than about 0.8 μm and equal to or less than about 6.3 μm.

17. The imaging device according to claim 11, wherein the cylindrical body is made of metal.

18. The imaging device according to claim 11, wherein the light-transmissive cover has a disk shape.

19. The imaging device according to claim 11, wherein the light-transmissive cover is made of light-transmitting plastic, quartz, or glass.

20. The imaging device according to claim 11, wherein the buffer layer has an annular shape.

\* \* \* \* \*